(12) United States Patent
Lynn

(10) Patent No.: US 6,495,117 B1
(45) Date of Patent: *Dec. 17, 2002

(54) PROCESS FOR RECOVERING SULFUR FROM $H_2S$-BEARING GAS

(75) Inventor: Scott Lynn, Pleasant Hill, CA (US)

(73) Assignee: Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/486,925

(22) PCT Filed: Sep. 3, 1998

(86) PCT No.: PCT/US98/18400

§ 371 (c)(1),
(2), (4) Date: Jun. 20, 2000

(87) PCT Pub. No.: WO99/12849

PCT Pub. Date: Mar. 18, 1999

Related U.S. Application Data

(63) Continuation-in-part of application No. 08/926,652, filed on Sep. 10, 1997, now Pat. No. 5,928,620.

(51) Int. Cl.$^7$ ............................................ C01B 17/04
(52) U.S. Cl. ........................ 423/573.1; 423/242.1; 423/574.1; 423/575; 423/576.8; 423/578.1
(58) Field of Search ................. 423/242.1, 242.2, 423/242.6, 242.4, 573.1, 574.1, 575, 578.1, 576.8

(56) References Cited

U.S. PATENT DOCUMENTS

| | | | | |
|---|---|---|---|---|
| 3,953,586 A | * | 4/1976 | Tanimura | 423/575 |
| 4,124,685 A | * | 11/1978 | Tarhan et al. | 423/574 L |
| 4,795,620 A | * | 1/1989 | Heisel et al. | 423/243 |
| 4,976,935 A | * | 12/1990 | Lynn | 423/222 |
| 5,098,681 A | * | 3/1992 | Christiansen et al. | 423/243 |
| 5,389,351 A | * | 2/1995 | Hasebe et al. | 423/242.1 |
| 5,397,556 A | * | 3/1995 | Towler et al. | 423/220 |

FOREIGN PATENT DOCUMENTS

| | | |
|---|---|---|
| EP | 0 102 894 A1 * | 3/1984 |
| EP | 0 127 206 A1 * | 12/1984 |
| WO | WO 86/02628 * | 5/1986 |
| WO | WO 99/12849 * | 3/1999 |

OTHER PUBLICATIONS

Quinlan et al. "Technical and economic comparison of Lo-Cat™ with other iron-based Liquid Redox Processes" presented at the 1992 G.R.I. Liquid Redox Sulfur Recovery conference, Oct. 4–6, 1992, Austin TX USA, prep'ed. for G.R.I. contract No. 5088–221–1753, pp. 179 and 181–215.*

* cited by examiner

Primary Examiner—Stanley S. Silverman
Assistant Examiner—Timothy C. Vanoy
(74) Attorney, Agent, or Firm—Townsend and Townsend and Crew LLP

(57) ABSTRACT

Elemental sulfur is recovered from the hydrogen sulfide present in natural gases and other process gases by treating the hydrogen sulfide-containing gas in a series arrangement of a liquid-phase reactor; a furnace and a sulfur dioxide absorber. The hydrogen sulfide-containing gas and a sulfur dioxide-containing gas are fed into the liquid-phase reactor where they are dissolved into a solvent, such as polyglycol monoethers, diethers of ethylene glycol, diethers of propylene glycol, etc., and react in the presence of a catalyst, such as tertiary amine, pyridine, isoquinoline, etc., to produce elemental sulfur. The feed rates of the hydrogen sulfide-containing gas and the sulfur dioxide-containing gas are selected so that there will be an excess of hydrogen sulfide in the solvent thereby ensuring that the reaction products will include, not only the elemental sulfur, but also residual, unreacted hydrogen sulfide. The residual, unreacted hydrogen sulfide is fed into a furnace, where it is combusted into a sulfur dioxide-containing gas. The sulfur dioxide-containing gas is fed into a sulfur dioxide absorber, where the sulfur dioxide is extracted from the gas and recycled back to the liquid phase reactor as the aforementioned sulfur dioxide-containing gas.

17 Claims, 6 Drawing Sheets

PROCESS FOR RECOVERING SULFUR FROM H₂S-BEARING GAS

CROSS REFERENCE TO RELATED APPLICATION

This patent application is a continuation-in-part of co-pending U.S. patent application Ser. No. 08/926,652, filed Sep. 10, 1997 now U.S. Pat. No. 5,928,620, which is incorporated herein by reference.

BACKGROUND OF THE INVENTION

1. Field of the Invention

This invention lies in the field of sulfur removal and recovery, and particularly in the treatment of sour gases and other gases in the chemical process industry that contain hydrogen sulfide.

2. Description of the Prior Art

Much of the natural gas produced in the United States has a hydrogen sulfide content exceeding 4 parts per million and is therefore classified as "sour." Since hydrogen sulfide is an environmental hazard, sour natural gas is considered unacceptable for transport or use. Hydrogen sulfide levels are also a problem in the fabrication of fuels derived from petroleum, coal and lignite, whose sulfur content is converted to hydrogen sulfide during the conversion of these materials to gasoline, jet fuels, refinery gas, coal gas, blue-water gas and the like. In addition to the environmental hazard, hydrogen sulfide represents a loss of the sulfur value of the raw material, which if recovered as elemental sulfur would be of significant use to the chemical industry.

The traditional method for converting hydrogen sulfide in natural gases and in gaseous plant effluents is the Claus process, in which part of the hydrogen sulfide is burned in air to form sulfur dioxide and water:

$$2H_2S + 3O_2 \rightarrow 2SO_2 + 2H_2O \tag{A}$$

and the sulfur dioxide thus produced is reacted with further hydrogen sulfide to form sulfur and additional water:

$$2H_2S + SO_2 \rightarrow \frac{3}{x}S_x + 2H_2O \tag{B}$$

The symbol "x" in Reaction B is used to denote that the elemental sulfur exists in a mixture of molecular species varying in the number of sulfur atoms per molecule.

The furnace (Reaction A) in the Claus process is operated with a fuel-rich mixture, converting only one-third of the H₂S to SO₂. The fuel-rich atmosphere results in the partial conversion of hydrocarbons that are present in the H₂S feed to such compounds as COS and CS₂, which lessen the yield of elemental sulfur and are themselves hazardous. The fuel-rich atmosphere also promotes the breakdown of aromatics to soot. For high sulfur recovery, precise control of the overall stoichiometry is needed, and this is made especially difficult when considerable amounts of CO₂ and other inerts are present.

Part of Reaction B occurs in the furnace and the rest is conducted in a heterogeneous system in which the reaction mixture is gas-phase and contacts a solid activated alumina catalyst of a sort well known to those skilled in the art of the Claus process. With continued use, the alumina catalyst fouls and becomes otherwise deactivated over time. This requires plant shutdown, loss of process time, and the cost of regeneration or replacement of the catalyst, together with the associated labor costs.

A further disadvantage of Reaction B is that it is equilibrium-limited at temperatures above the dewpoint of sulfur, and despite being performed in two to four stages, the reaction leaves 2% to 5% of the H₂S and SO₂ unreacted. Each stage requires a separate condenser to remove the elemental sulfur, and these condensers require a large heat-exchange area and reheating of the gas leaving each but the last condenser. Furthermore, the steam generated by each condenser is low in pressure, limiting its usefulness. Additional costs are entailed in treating the tail gas in which the sulfur content must be reduced by ten to twenty times.

SUMMARY OF THE INVENTION

It has now been discovered that virtually complete conversion of hydrogen sulfide in natural gas or other gas mixtures to elemental sulfur and water can be achieved with the use of a single-stage reaction between hydrogen sulfide and sulfur dioxide, in a manner producing no reaction products other than elemental sulfur and water. The reaction $$2H_2S + SO_2 \rightarrow 3S + 2H_2O \tag{I}$$

is conducted with excess H₂S in the liquid phase in the presence of a homogeneous liquid-phase Claus catalyst, at a temperature above the melting point of sulfur but low enough to keep the reaction in the liquid phase, and upstream of the furnace where unreacted H₂S is combusted to produce the SO₂ that is consumed in reaction (I). The H₂S that is combusted in the furnace is the excess H₂S that passes unreacted through the liquid-phase reaction, optionally supplemented by H₂S from an H₂S-containing stream that bypasses the reaction (I) reactor. The SO₂ in the furnace combustion gas is recycled to the reaction (I) reactor either as a gas or dissolved in a solvent, and in any case serves as the entire SO₂ feed to the reaction.

In basic terms, the invention as shown in FIG. 1 proceeds as follows:

(a) In a first stage 1, an H₂S-containing mixture is passed through a continuous-flow catalytic reactor where the mixture contacts SO₂ in accordance with the reaction $$2H_2S + SO_2 \rightarrow 3S + 2H_2O \tag{I}$$

using approximately 10% to 50% excess H₂S. The H₂S enters the reactor either as a gas or dissolved in an organic solvent; in most cases the H₂S will enter as a gas. The SO₂ likewise enters the reactor either as a gas or dissolved in an organic solvent. Regardless of the phases of the streams entering the reactor, both reactants dissolve in an organic liquid solvent flowing through the reactor, the solvent entering either with one of the two incoming reactant streams with the H₂S or the SO₂ dissolved in the solvent, or as a circulating stream recycled from the reactor exit. The reaction causes a major fraction of the SO₂, preferably substantially all of it, to react. The term "a major fraction" is used herein to indicate at least half, and preferably 80–90% or more. The organic liquid solvent also contains a dissolved catalyst that promotes reaction (I). The reaction produces elemental sulfur, which is recovered from the product mixture by phase separation. The reaction is conducted at a temperature above the melting point of sulfur and below the boiling point of the solvent, preferably below the temperature at which sulfur polymerizes.

(b) In a second stage, 2, H₂S, including H₂S that passed unreacted through the first stage, is combusted with oxygen according to the reaction $$2H_2S + 3O_2 \rightarrow 2SO_2 + 2H_2O \tag{II}$$

to convert the $H_2S$ to $SO_2$. Hydrocarbons that may accompany the $H_2S$ are combusted to $CO_2$ and $H_2O$ whereas organic sulfur compounds that may be present additionally yield $SO_2$.

(c) In a third stage, 3, the $SO_2$ produced in the second stage is recovered by absorption and returned to the reactor (the first stage). The $SO_2$ in the third stage may be recovered in the solvent used in the first stage, 1, with the first stage catalyst dissolved in the solvent. The solution containing both the $SO_2$ and the catalyst can then be recycled in its entirety to the continuous-flow reactor (the first stage) as the $SO_2$ feed to the reactor. Alternatively, the solvent used to recover the $SO_2$ in the third stage, 3, may be kept separate from the solvent in the reactor of the first stage, 1, with the $SO_2$ being stripped from it and sent to the first stage, 1, as a gas. The third stage absorption leaves a tail gas that is substantially free of $H_2S$ and $SO_2$.

Various additional process stages upstream, intermediate and downstream of these three stages are included in any of various arrangements in preferred embodiments of the invention to enhance the flow and transfer of streams, to separate phases and control concentrations and flow rates, to separate the water formed in Reactions I and II, and to control other process parameters such as temperature and pressure. These and. other characteristics, features and advantages of the invention will be better understood from the description that follows.

DETAILED DESCRIPTION OF THE INVENTION AND PREFERRED EMBODIMENTS

Figure 1:
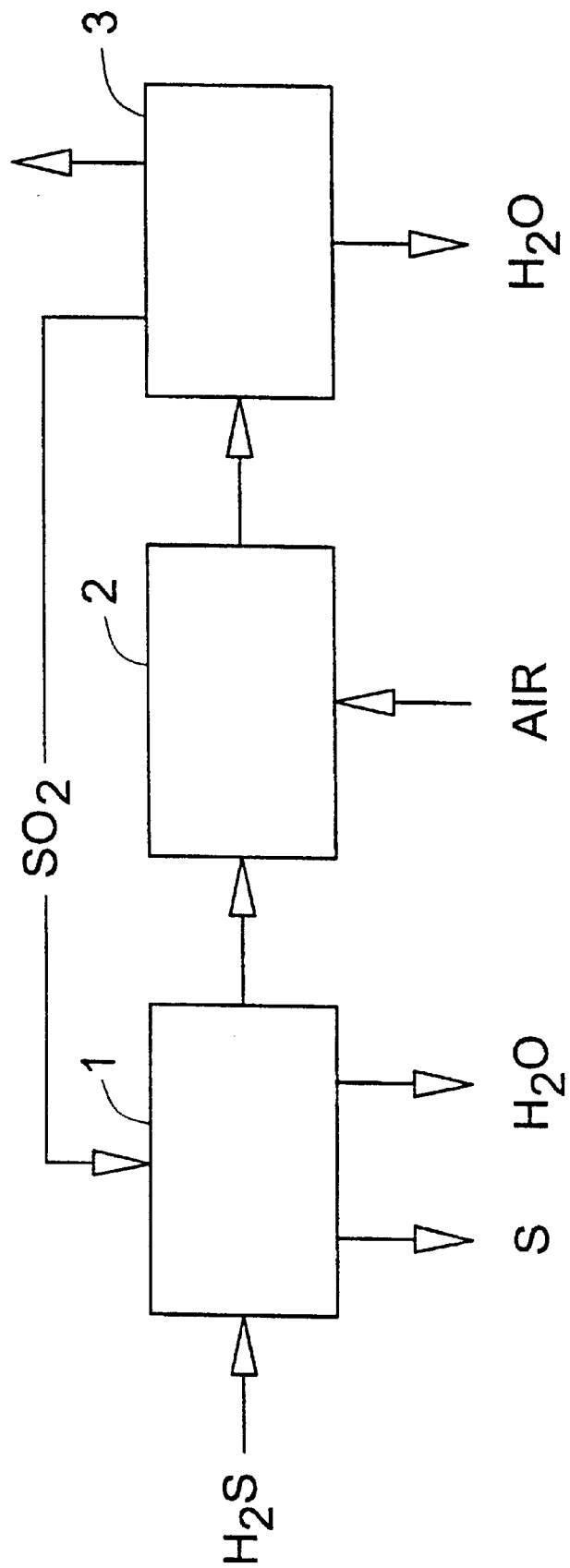
FIG. 1 is a block flow diagram illustrating the three primary stages of the process of this invention.

Referring to FIG. 1, the continuous-flow reactor 1 described above serves as the first stage. In this stage, $H_2S$ contacts $SO_2$ in the presence of an organic liquid that promotes the conversion of these reactants to elemental sulfur and water according to Reaction I. The reaction occurs in the liquid phase, and the liquid contains a homogeneous liquid-phase catalyst, i.e., one that is dissolved in the liquid reaction mixture.

When the $H_2S$-containing stream is fed to the reactor as a gas, the stream preferably contains at least about 20 mole percent $H_2S$ and preferably from about 25 mole percent to substantially 100 mole percent $H_2S$. The concentration of $H_2S$ entering the reactor is not critical to this invention and can vary widely, but is preferably greater than the $H_2S$ concentration in a typical natural gas stream or process stream from a fossil-fuel treatment plant. If desired, the concentration is readily increased by selectively absorbing the $H_2S$ from the gas stream into a solvent, then stripping the $H_2S$ from the solvent. The solvent can be the same solvent used in the continuous-flow reactor. Alternatively, a different solvent can be used in a separate flow loop. If the solvent is drawn from the reactor, the solvent may also contain water produced by Reaction I above, and the stripper will preferably volatilize the water from the solvent simultaneously with the stripping of the $H_2S$. The emerging gas stream will then contain both $H_2S$ and water vapor. In any event, in preferred embodiments, the $H_2S$-containing stream fed to the continuous-flow reactor 1 will be either partially or entirely in the gas phase in the concentration ranges indicated above. The $H_2S$-containing gas mixture prior to concentration is typically a sour gas whose $H_2S$ content can vary widely, ranging from as low as 0.01 mole percent to levels of 1.0 mole percent and above.

In embodiments where the $SO_2$ enters the continuous-flow reactor as a liquid, it can be rendered in liquid form by being dissolved in the solvent that is used in the $SO_2$ absorber (identified above as the third stage) at a concentration of at least about 1% by weight, more preferably from about 1% to about 40% by weight, and most preferably from about 3% to about 10% by weight. Alternatively, it can be dissolved prior to or upon entering the reactor in a solvent that is independently circulated rough the. reactor.

The solvents used in the practice of this invention are preferably of moderate to low viscosity, as well as being chemically inert to the reactants, products or other components with which they come in contact. For any particular solvent, this will depend on the particular unit of the process in which the solvent is used. Preferred solvents are those that readily absorb $H_2S$ and $SO_2$, that do not form an azeotrope with water, that are chemically inert to the reactants, liquid sulfur and water, and that have limited mutual solubility with liquid sulfur. Preferred solvents are those that are derived from ethylene oxide or propylene oxide by a ring-opening reaction with a co-reactant having an active hydrogen, provided that the resulting solvent is inert with respect to both sulfur and $SO_2$. Many of the polyglycol monoethers and many of the diethers of both ethylene and propylene glycol meet these descriptions. When the reaction is run in these solvents, no sulfur compounds of a higher oxidation state are formed, and thus elemental sulfur and water are the sole products of the reaction. Examples are glycols and glycol ethers derived from ethylene oxide or propylene oxide, particularly ethers of ethylene glycol, diethylene glycol, triethylene glycol, tetraethylene glycol, propylene glycol, dipropylene glycol, tripropylene glycol, and tetrapropylene glycol. Specific examples are the monomethyl, dimethyl, monoethyl, and diethyl ethers of these glycols. The more preferred among these are the monomethyl ether of diethylene glycol, and the monomethyl and diethyl ethers of triethylene glycol, propylene glycol, dipropylene glycol, and tripropylene glycol. The most preferred is diethylene glycol monomethyl ether (DGM). Additional solvents capable of use in this invention are various trialkyl and alkyldialkanol amines such as triethyl amine and methyldiethanol amine, and liquid alkyl and aryl quaternary ammonium salts. Primary and secondary amines react with elemental sulfur and are therefore not suitable.

As the catalyst for reaction (I), tertiary amines are preferred, particularly lower alkyl-substituted tertiary amines, lower alkyl- and aryl-substituted tertiary amines, and aryl-substituted tertiary amines, including those in which the amine nitrogen is an aromatic ring atom. Examples of useful tertiary amines that do not contain an aromatic ring nitrogen are N,N-dimethyl aniline, triethylamine, tri-n-butylamine, and mixed trialkylamines. Preferred catalysts are those that do contain an aromatic ring nitrogen that is not sterically hindered by substitutions at carbon atoms adjacent to the ring nitrogen. Particularly preferred catalysts are pyridine and isoquinoline, optionally substituted at one or more sites other than carbon atoms adjacent to the ring nitrogen with a polar group. Examples of suitable polar groups substituents are hydroxyl, hydroxyalkyl, acetamido, acetamidoalkyl, acetyl, acetylalkyl, acetyloxy, acetyloxyalkyl, alkoxy, alkoxyalkyl, amino, alkylamino, and aminoalkyl groups. The "alkyl" portions of these terms refers to lower alkyl, i.e., $C_1$–$C_6$ alkyl, straight- or branched-chain, provided that the alkyl group does not fully mask the polar character of the substituent. Preferred alkyl groups are $C_1$–$C_4$, particularly methyl and ethyl. Particularly preferred substituents are hydroxyl, hydroxymethyl, acetamido, acetamidomethyl, acetyl, acetylmethyl, acetyloxy, and acetyloxymethyl. The most preferred ring structure is pyridine, and the most preferred catalyst is 3-(hydroxymethyl)pyridine (3-pyridyl carbinol).

The concentration of catalyst in the solvent is not critical to the invention and can vary widely. For effective and economical results, a typical range of concentration is from about 0.1% to about 1.0% by weight, although concentrations above and below this amount can be used effectively as well.

The $H_2S$ entering the reactor section 1 will frequently contain small-to-moderate concentrations of other gases such as $CO_2$, hydrocarbons, mercaptans, COS and $CS_2$. Such compounds are inert in the Stage 1 reaction, and will pass through the reactor 1 unchanged, together with the excess $H_2S$.

When one or both of the reactant feed streams entering the reaction stage is gas, the flow through the reactor can be either cocurrent or countercurrent. For cocurrent flow, the reactor is preferably a loosely packed bed of inert column packing designed for enhanced turbulent solid-liquid contact. Examples of column packings that can be used are Raschig® rings, Lessing® rings, Berl® saddles, Intalox® saddles, Tellerettes®, Pall® rings, and various designs of structured packing that are readily available in the industry. Countercurrent flow reactors are likewise of conventional design. Packed columns such as those described above for cocurrent flow can be used for countercurrent flow as well. Other alternatives, however, are plate columns with plates such as bubble cap plates, sieve plates, valve plates and baffle plates.

The residence time within the reactor is not critical and can vary widely but should be sufficient for $SO_2$ to react to extinction. In view of the excess $H_2S$, this will typically be achieved with a gas-phase residence time ranging from about 0.5 second to about 30 seconds, preferably from about 1 second to about 20 seconds, more preferably from about 1 second to about 15 seconds. In the particularly preferred practice of this invention, the gas-phase residence time is from about 2 seconds to about 10 seconds.

The temperature and pressure of the reaction are usually selected to produce elemental sulfur as a separate, clear yellow liquid phase. This is generally achieved by conducting the reaction at a temperature between the melting point of sulfur (119° C.) and its polymerization temperature (about 155° C.). A preferred temperature range is from about 125° C. to about 145° C. It is then also preferred that at least some of the water produced by the reaction be volatilized in the reactor to leave the reactor as part of the off-gas. However, it is possible to operate the reactor below the melting point of sulfur if provision is made for handling the solid, crystalline product as it forms. In a broader sense, therefore, the reactor can be operated within a temperature range of from about 45° C. to about 150° C. Preferred temperatures, however, are those within the ranges cited above. The temperature is maintained in the desired range by allowing water to evaporate from the solvent or by suitable indirect heat exchange. Means of achieving this will be readily apparent to those skilled in reactor design.

The furnace 2 described above as the second stage of the process of this invention combusts the unreacted (excess) hydrogen sulfide from the continuous-flow reactor with an oxygen-containing gas. Air is the most convenient, but other oxygen-containing gas mixtures (in which essentially all other components thereof are inert) or oxygen itself can be used. To avoid forming $SO_3$ and oxides of nitrogen ($NO_x$), or to minimize the formation of these gases, the furnace is preferably operated to result in little or no $O_2$ in the combustion gas leaving the furnace. This can be accomplished by performing the combustion under conditions ranging from stoichiometric to slightly fuel-rich, i.e., the $H_2S$ entering the furnace should range from about stoichiometric relative to the oxygen in Reaction II above, to about a 5% excess. In certain embodiments of this invention, the furnace is operated at a slight excess of oxygen rather than $H_2S$. Gaseous components of the $H_2S$ feed such as hydrocarbons, mercaptans, COS, and $CS_2$ are burned completely under these conditions. Sulfur-containing compounds yield their sulfur as $SO_2$. When $CO_2$ is a component of the feed, it passes through the furnace unchanged and hinders the combustion only if its concentration is excessive.

The $H_2S$ feed to the furnace 2 will include all of the $H_2S$-containing gas that has bypassed the reaction stage 1. When this is done, it is still preferable to maintain excess $H_2S$ in the reaction stage 1, although perhaps less than when all of the $H_2S$ fed to the process is directed to the reaction stage. In processes that include $H_2S$ bypass, up to about 30%, or preferably about 10% to about 30%, of the $H_2S$ feed to the process can be bypassed. Whether or not an $H_2S$ bypass is used, the total $H_2S$ fed to the process as a whole (including the bypass $H_2S$ if one is present) is preferably at an excess of approximately 50% relative to the $SO_2$ fed to the reaction stage 1, with reference to the stoichiometry of reaction (I).

The $SO_2$ absorber 3, the third stage of the process of the invention, recovers the $SO_2$ from the stack gas in a form in which it can be recycled, or further prepared for recycle, back to the reaction stage 1. The absorbing solvent may be the same solvent used in the reaction stage 1 and thereby returned to the reactor as a carrier of the $SO_2$. Alternatively, the absorbing solvent may be part of a separate loop from which the $SO_2$ is first stripped before being fed to the reactor. When the absorbing solvent is used as the carrier of the $SO_2$ to the reactor, the solvent will also contain the liquid-phase catalyst for reaction (I).

When the absorbing solvent is recovered from the product stream leaving the reaction stage 1, the absorbing solvent is preferably stripped of the net water added to the solvent in stage 1 and substantially all dissolved $H_2S$ prior to the entry of the solvent into the absorber. In the solvents preferred for this process, the solubility of $SO_2$ is very high. These solvents absorb substantially all of the $SO_2$ from the combustion gas. The $SO_2$ in the tail gas leaving the absorber can be reduced to 10–100 parts per million (ppm) by volume, which is well below current emission limits. The solubility of $CO_2$ in these solvents is relatively low and the amount of $CO_2$ absorbed from the combustion gas is insignificant.

The tail gas from the $SO_2$ absorber is thus substantially free of $H_2S$ and SO2. The term "substantially free" is used in this context to include trace amounts of each gas, such as amounts in the range of approximately 10–100 ppm or less for $SO_2$ and approximately 0.01–1.0 ppm or less for $H_2S$.

FIGS. 2 through 6 are detailed process-flow diagrams for particular sulfur recovery processes within the scope of the invention.

Figure 2:
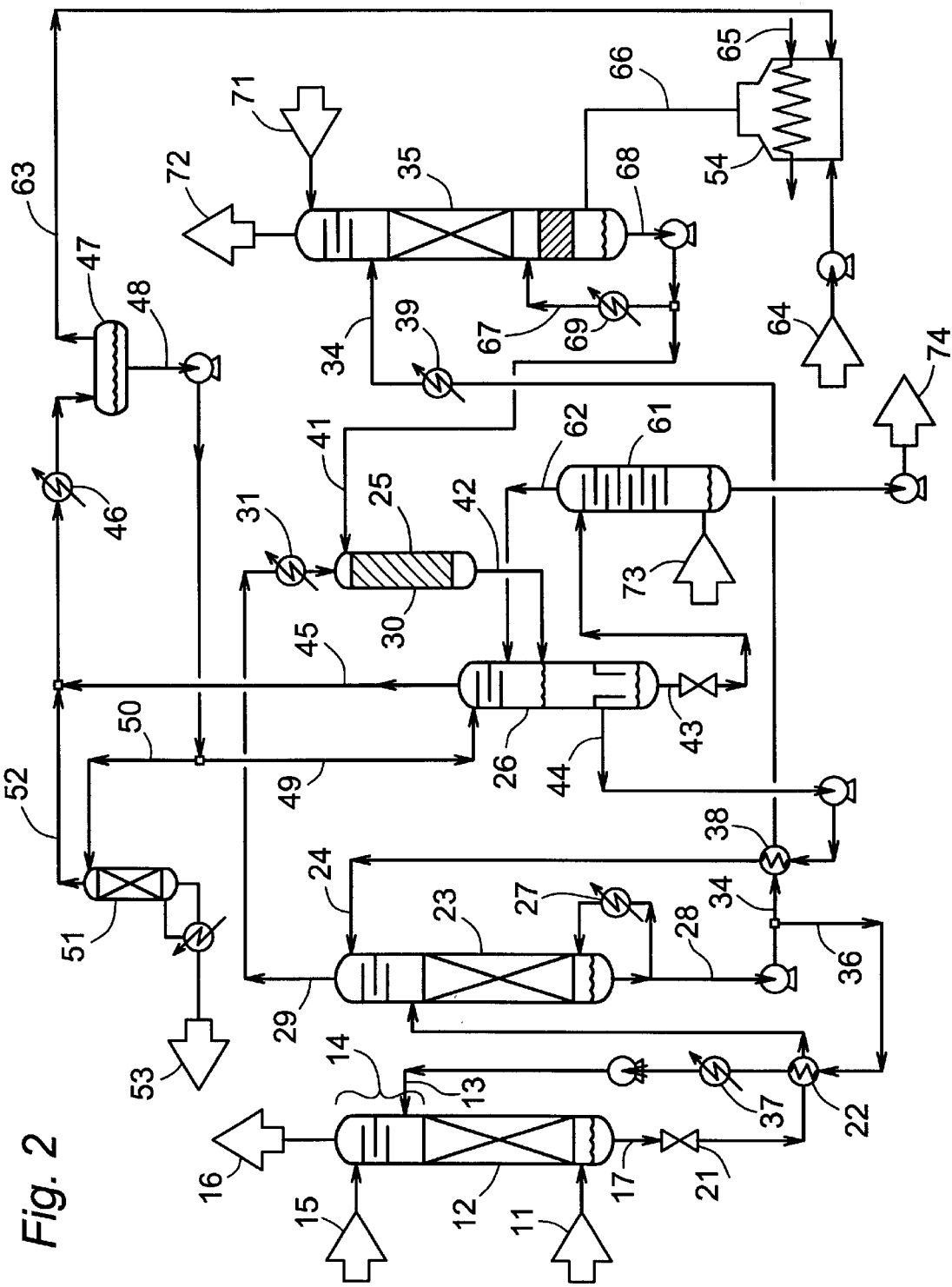
FIG. 2 is a process-flow diagram illustrating an embodiment of the invention in which the feed gas is a high-pressure sour natural gas stream or other $H_2S$-containing stream having a relatively high content of $H_2S$ and a relatively low content of hydrocarbons with 5 or more carbon atoms. The $SO_2$ is fed to the reactor as a solution in an organic solvent that also contains a dissolved catalyst.

FIG. 2 is a process-flow diagram for a plant designed for a reaction using liquid-phase $SO_2$ and a liquid-phase catalyst, with a feed of sour natural gas 11 at 1,000 pounds per square inch absolute (psia) (68 atmospheres) containing 2.7 mole percent $H_2S$ and 0.1 mole percent $H_2O$. The sour gas is first passed through an absorber 12 in upward flow, the absorber being a packed tower with counter-current flow of gas and liquid. The solvent 13 with dissolved catalyst enters the top of the absorber 12 at about 40° C. (104° F.) at a rate of about 3 kg per 100 moles of feed gas, or about 1.5 times the minimum flow required for absorption of the $H_2S$ in the feed gas. Using diethylene glycol monomethyl ether (DGM) as the solvent, the gas stream rising past the packed section of the absorber 12 (still within the absorber) is equilibrated with water present in the incoming solvent stream 13 and contains about 10 ppm (by volume) of DGM. In the portion 14 of the absorber above the packed bed, a small stream of water 15 is introduced to absorb remaining solvent and prevent loss of the solvent into the sweet ($H_2S$-free) gas 16 leaving the top of the absorber.

The $H_2S$-rich solvent 17 leaving the absorber contains almost all of the $H_2S$ and $H_2O$ in the sour gas feed. The $H_2S$-rich solvent passes through a valve 21 where its pressure is dropped to near atmospheric, then preheated in a heat exchanger 22 prior to entering the solvent stripper 23 as a side stream. Entering the top of the solvent stripper 23 is a stream of wet solvent 24 which also contains a small amount of $H_2S$. The stream of wet solvent 24 is the liquid effluent from the continuous-flow reactor 25 (which corresponds to Stage 1 of FIG. 1 and is discussed below), after separation from the unreacted $H_2S$, water vapor and liquid sulfur that are produced in the reactor 25, the separation having been performed in a gas-liquid-liquid separator 26 (discussed below). The wet solvent stream 24 contains the solvent and catalyst used in that reactor plus water and a small amount of dissolved $H_2S$, the wet solvent having been separated from the gas and liquid sulfur in the gas-liquid-liquid separator 26.

The solvent stripper 23 operates at a pressure slightly above atmospheric and is heated by a reboiler 27. The lean solvent 28 emerging as the stripper bottoms is substantially free of $H_2S$ and entirely free of $SO_2$, and contains about 1% water (by weight) at a temperature of about 170° C. (338° F.). The vapor stream 29 leaving the solvent stripper contains the $H_2S$, water, hydrocarbons, and other components that have been absorbed from the sour feed gas 11, plus the water and $H_2S$ returned from the gas-liquid-liquid separator 26. This vapor steam, which contains about 2.5 moles of water vapor per mole of $H_2S$, is directed through a partial condenser 31 to the reactor 25.

The heat input to the reboiler 27 is about 102 kcal per mole of $H_2S$ in the feed gas. The stripping factor for water from the DGM solvent, $K_{water}V/L$, is 7 or higher. Only four theoretical stages are needed to reduce the $H_2O$ content of the solvent to 1% and to strip 99.99% (all by weight) of the $H_2S$ from the solvent.

The lean solvent 28 emerging from the bottom of the solvent stripper 23 is split into two fractions, one 34 directed to the $SO_2$ absorber 35 (which corresponds to Stage 3 of FIG. 1 and is discussed below) and the other 36 directed to the $H_2S$ absorber 12. The latter fraction 36 heats the $H_2S$-rich solvent 17 in the heat exchanger 22 between the $H_2S$ absorber 12 and the solvent stripper 23 and is then cooled further with cooling water to about 40° C. (104° F.) in a heat exchanger 37. The former fraction 34 passes through a heat exchanger 38 where it preheats the liquid stream emerging from the gas-liquid-liquid separator 26 before that stream enters the solvent stripper 23. The lean solvent in this fraction is further cooled with cooling water to about 40° C. (104° F.) in a heat exchanger 39 prior to entering the $SO_2$ absorber 35.

The vapor stream 29 (off-gas) from the solvent stripper 23 contains about 2.5 moles of $H_2O$ per mole of $H_2S$. About one-third of the water vapor condenses in the partial condenser 31, and the entire stream, including both condensate and gas, enters the top of the reactor 25. Also entering at the top of the reactor is $SO_2$-rich solvent 41 (plus dissolved catalyst) at a temperature of about 45° C. (113° F.), and the two flow cocurrently downward through a packed bed 30. As an example, the flow rate of solvent 41 may be 0.33 kg per mole of $H_2S$ in the sour gas feed 11. The reactor itself may have an active volume measuring about 0.075 times the hourly volumetric flow rate of solvent, and may be packed with one-half inch (1.3 cm) Pall rings. The temperature close to the point of entry in the reactor is about 115° C. (239° F.), and the temperature of the mixed-phase product stream 42 leaving the reactor is controlled at 120–140° C.

The mixed-phase product stream 42 is directed to the gas-liquid-liquid separator 26, where (i) the liquid sulfur 43, (ii) the water-, $H_2S$- and catalyst-containing solvent 44, and (iii) the $H_2S$- and water-containing gas 45 are separated into three separate streams. The $H_2S$- and water-containing gas stream 45 is passed through a cold-water condenser 46 to a gas-liquid separator 47. The liquid stream 48 drawn from the separator is split into two streams 49, 50. One of these streams 49 is returned to the top of the gas-liquid-liquid separator 26 to absorb additional solvent vapor and thereby prevent loss of the solvent. This added water also serves to reduce the solubility of the liquid sulfur in the solvent in the separator 26. The water is then separated from the solvent in the solvent stripper 23. With the sulfur content thus lowered (or eliminated), the lean solvent 28 can be cooled to 40° C. (104° F.) by the heat exchangers shown, without depositing solid sulfur on the heat-exchange surfaces. The amount of water required to achieve this result is presently believed to be about 7.5 moles/kg of DGM. This amounts to about 0.33 moles of water per mole of $H_2S$ in the sour feed gas 11.

The second stream 50 is fed to a small $H_2S$/water stripper 51 where the $H_2S$ is driven off as a gas 52 from the water 53. The remaining water 53 represents the net flow of water absorbed from the feed gas plus the water formed by reaction in both the reactor 25 and the furnace 54 (discussed below). The $H_2S$ 52 thus driven off is passed again through the gas-liquid separator 47.

The liquid sulfur stream 43 produced in the reactor 25 and separated in the gas-liquid separator 26 is fed to a dry-steam stripper 61 to recover any $H_2S$ and solvent 62 that are present in the sulfur and to return them to the gas-liquid-liquid separator 26. Steam 73 is introduced into stripper 61 and liquid sulfur 74 is recovered. The amount of sulfur produced is 0.9999+ moles per mole of $H_2S$ in the sour gas feed 11.

The gas stream 63 leaving the gas-liquid separator 47 is fed directly to the furnace 54 (corresponding to Stage 2 of FIG. 1) where the gas stream is combusted with atmospheric air 64. In the fuel-rich mixture in the furnace 54, the $H_2S$ is converted to $SO_2$, and the sulfur content of mercaptans, COS and other sulfur-containing compounds is also converted to $SO_2$. Hydrocarbons and other organics are burned to $CO_2$ and $H_2O$. Because of the high concentration of $SO_2$ in the combustion gas, no H2, CO, COS, $CS_2$ or soot will form.

The combustion of the $H_2S$ will yield 118 kcal/mole at 95% efficiency. Energy is collected by generating steam from boiler feed water 65 that is fed through the furnace. The steam can be used in the reboiler 27 at the base of the stripper 23. Adding further to the energy generated in the furnace is the combustion of organics present in the stripper off-gas 45, which are carried through the gas-liquid separator 47 to the furnace together with the $H_2S$.

The combustion gas 66 leaving the furnace contains one mole each of $SO_2$ and $H_2O$ and six moles of nitrogen gas per mole of $H_2S$ gas entering the furnace. The combustion gas 66 is directed to the $SO_2$ absorber 35, where it is absorbed in counter-current flow by the lean solvent 34 (which is substantially free of $H_2S$ and entirely free of $SO_2$). With DGM as the solvent, the heats of solution of $SO_2$ and $H_2O$ are about 9 kcal/mole and 10 kcal/mole, respectively, which would produce a temperature rise of about 32° C. in the DGM for an outlet concentration of one mole of $SO_2$ per kg of DGM. The sensible heat of the furnace gas, together with water of combustion from any hydrocarbons would further contribute to the temperature rise. To control the temperature and to minimize the net flow of solvent through the absorber, a quench stream 67 is drawn from the $SO_2$-bearing solvent 68 emerging from the bottom of the absorber, cooled in heat exchanger 69 and recycled to the absorber. As in the $H_2S$ absorber, a small stream of water 71 is introduced into the top of the $SO_2$ absorber 35 above the introduction point of the lean solvent 34, to reduce the solvent content of the stack gas 72.

Figure 3:
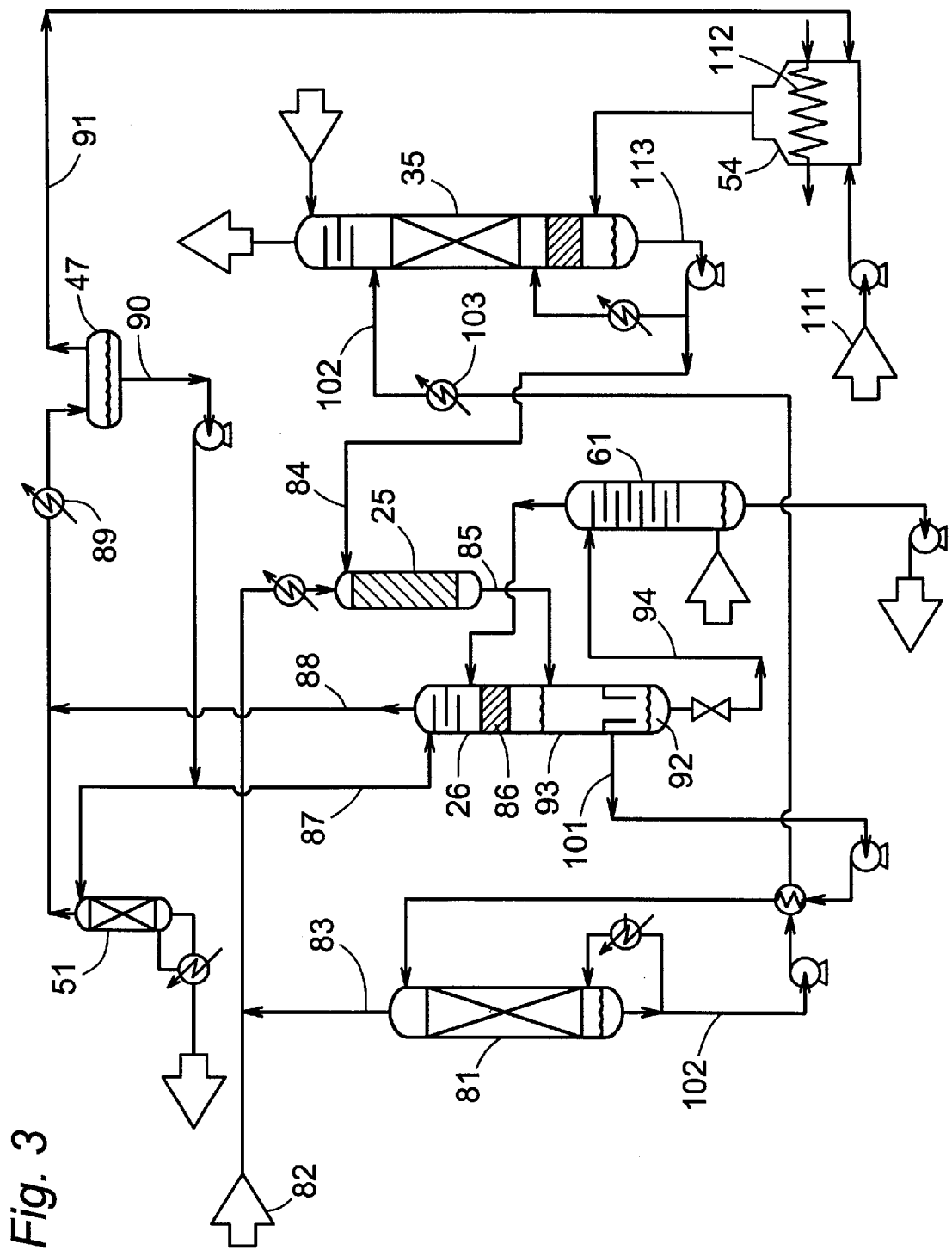
FIG. 3 is a process-flow diagram illustrating an embodiment of the invention in which the feed gas is an $H_2S$-containing gas stream typical of an alkanolamine absorber/stripper operation that recovers $H_2S$ from a process gas. As in the embodiment of FIG. 2, the $SO_2$ is fed to the reactor as a solution in an organic solvent that also contains a dissolved catalyst.

FIG. 3 depicts a variation of the process flow diagram of FIG. 2, designed for sour feed gases that are predominately $H_2S$. Such feed gases are typical of the off-gas from an alkanolamine (or activated potassium carbonate) absorber/stripper operation used to remove $H_2S$ and other acid gases from a process gas stream, although the $H_2S$-rich feed gas may be from other sources as well. The feed gas may also contain $CO_2$, hydrocarbons, mercaptans, COS, etc., but the fraction of $H_2S$ will typically exceed 50% and can approach 100%. All components and flows in this example are the same as in the corresponding parts of FIG. 2, except for the solvent stripper 81, which in this process serves only to separate the water and dissolved $H_2S$ in the solvent leaving the gas-liquid-liquid separator 26.

The absorber/stripper referred to in the preceding paragraph is not shown in FIG. 3, but is of conventional construction and operation. The amine solvent used in the absorber portion of the absorber/stripper is preferably an aqueous solution of an alkanolamine, a dialkanolamine, or an alkali metal carbonate. Preferred among the alkanolamines and dialkanolamines are ($C_1$–$C_4$ alkanol)-amines and di-($C_1$–$C_4$ alkanol)-amines, examples of which are monoethanolamine, diethanolamine, methyldiethanolamine, diglycolamine, propanolamine and isopropanolamine. Preferred among the alkali metal carbonates is potassium carbonate. The $H_2S$ is then stripped from the solvent by conventional means.

The $H_2S$-rich feed stream 82 enters the continuous-flow absorber/reactor 25 (corresponding to Stage 1 of FIG. 1) where it is contacted in cocurrent flow with a solution of $SO_2$ 84 which contains a homogeneous catalyst for the liquid-phase Claus reaction between $H_2S$ and $SO_2$. The pressure in the absorber/reactor 25 is maintained at 1.5 to 2 atmospheres absolute. Any dissolved $SO_2$ that is desorbed at the reactor inlet will be reabsorbed as the reaction progresses. The contact time in the absorber/reactor 25 is controlled to achieve complete or substantially complete reaction of the $SO_2$ in the solution.

The stream leaving the bottom 85 of the absorber/reactor 25 is a combination of gas and liquid phases which are separated in the gas-liquid-liquid separator 26. The gas phase flows through a packed section 86 at the top of the separator and is washed with water 87 to remove solvent vapor. The gas 88 leaving the vapor-wash section is. cooled 89 as needed to condense water 90, and the uncondensed gas 91 flows to the furnace 54.

Returning to the gas-liquid-liquid separator 26, the lower of the two liquid phases 92 is liquid sulfur, which is decanted from the lighter liquid solvent phase 93. Water enters the gas-liquid-liquid separator 26 from two sources—one is the product stream 85 from the absorber/reactor 25, and the other is the condensate 87 condensed from the overhead stream from the gas-liquid-liquid separator. The water thus added to the separator helps to separate most of the dissolved sulfur from the solvent and the separated sulfur joins the rest of the sulfur stream 94 formed in the reactor.

The wet solvent 101 emerging from the gas-liquid-liquid separator 26 is fed directly to the solvent stripper 81 where the $H_2S$ and most of the water are removed from the solvent. The solvent 102 leaving the stripper 81 is then cooled 103 and directed to the absorber 35. Since the $SO_2$ content of the solvent at this point is virtually zero, the solvent is a very effective sorbent for $SO_2$ in the absorber 35.

The furnace 54 operates with slightly more than stoichiometric air 111 to generate the $SO_2$ that is then absorbed by the lean solvent 102 in the $SO_2$ absorber 35 while avoiding $SO_3$ formation. Sulfur-containing compounds such as COS, mercaptans and others are also burned in the furnace 54 to recover their sulfur content (as $SO_2$) and heating value with no risk of discharging such compounds to the atmosphere. The furnace 54 typically generates an exhaust gas containing 10% to 20% $SO_2$ by volume. This gas is cooled to about 150° C. in a waste-heat boiler 112 and fed to the $SO_2$ absorber 35. The $SO_2$ solution 113 leaving the absorber is heated and returned to the absorber/reactor 35. A characteristic of this process is that the steam required to recover the water from the wet solvent entering the stripper exceeds that produced in the waste-heat boiler.

The stream leaving the bottom 174 the absorber/reactor 172 contains both gas and liquid phases which are separated in a gas-liquid-liquid separator 175. The gas phase flows through a packed section 176 at the top of the separator and is washed with water 177 to remove solvent vapor. Makeup water 177A may be added as needed, for instance at startup or as needed to compensate for excess evaporation. The gas 178 leaving the vapor-wash (packed bed) section is cooled 179 as needed to condense water, which is separated from the uncondensed gas in a gas-liquid separator 181 and circulated back to the packed bed section 176. The uncondensed gas 182 flows to the furnace and waste heat boiler 183.

In the gas-liquid separator 175, liquid sulfur 185 forms the lower of two liquid phases and is decanted from the solvent 184 which forms the upper of the two liquid phases. The solvent 184 phase is fed directly to the solvent stripper 191 where the $H_2S$ dissolved in the solvent is stripped with steam 190 and removed as overhead 192. The solvent 193 drawn from the bottom of the stripper flows to a vacuum crystallizer 194, where much of the remaining water is flashed to cool the solvent to the temperature required to operate the $SO_2$ absorber 195 (35° C. to 45° C.), which is essentially the same as the corresponding unit of the process flow diagram of FIG. 2. Water 194A can be removed from the system, e.g., to wastewater treatment. The residue slurry in the crystallizer is pumped to a surge tank 196 where sulfur crystals that are formed in the crystallizer are permitted to settle to form a more concentrated slurry 197 that is pumped back to the gas-liquid-liquid separator 175. In the gas-liquid-liquid separator 175, the crystals in the concentrated slurry melt and join the liquid sulfur product. Clarified solvent 198 that is lean relative to both $H_2S$ and $SO_2$ is drawn from the surge tank 196 and passed to the $SO_2$ absorber 195.

This process configuration requires only about 20% of the steam output of the waste-heat boiler for its operation.

Figure 5:
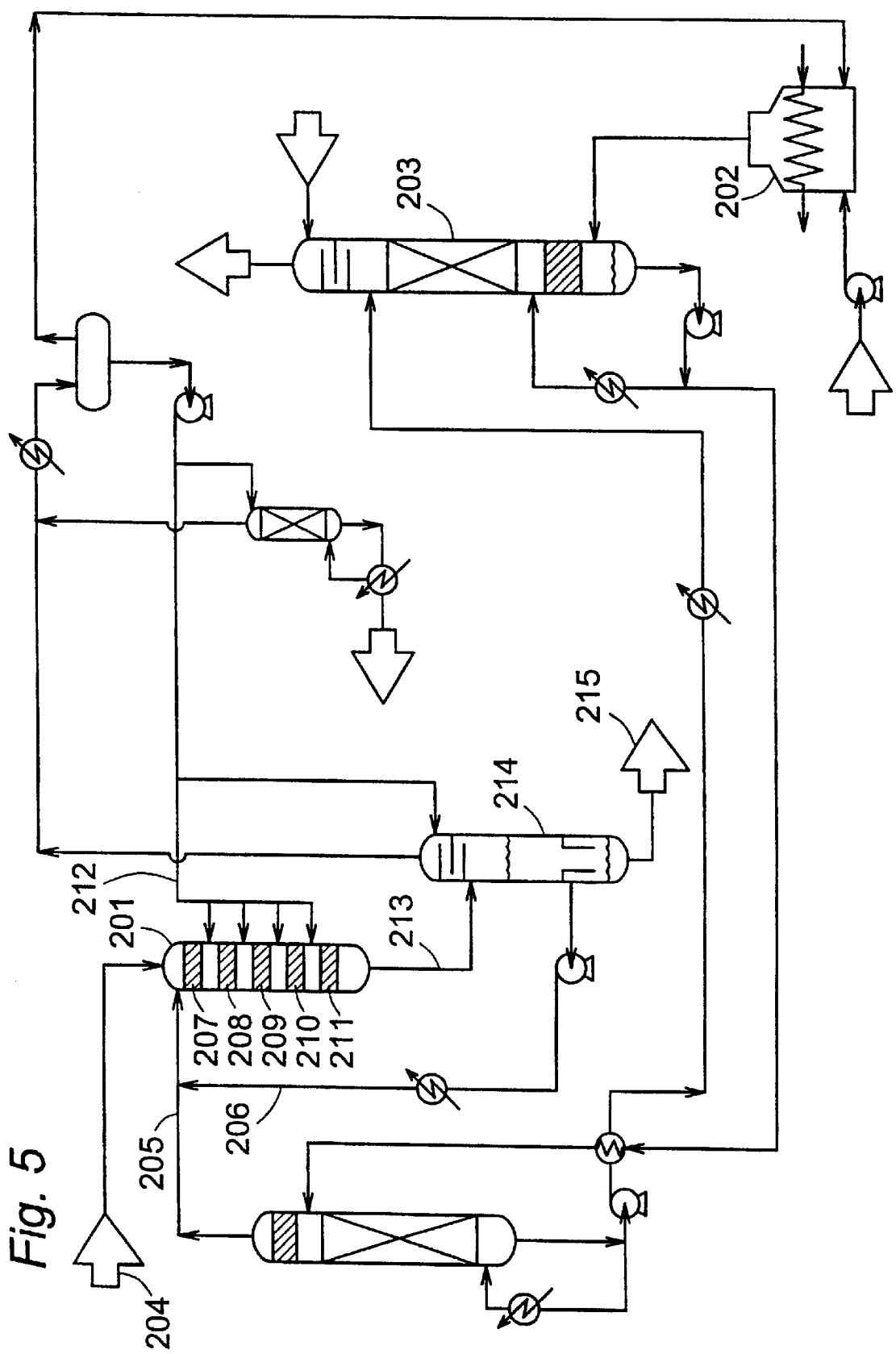
FIG. 5 is a process-flow diagram illustrating a still further embodiment of the invention, in which the $SO_2$ absorbed from the furnace combustion gas is stripped from the absorbing solvent before being fed to the reactor.

The process configuration of FIG. 5 presents yet another example. The basic elements of the invention are present as a packed reactor column 201 corresponding to Stage 1 of FIG. 1, a furnace and waste-heat boiler 202 corresponding to Stage 2, and a $SO_2$ absorber 203 corresponding to Stage 3. Both the incoming $H_2S$-rich stream 204 to the reactor column 201 and the incoming $SO_2$-rich stream 205 are in the gas phase. In the reactor column, the two streams are mixed with an organic solvent 206 that contains a dissolved homogeneous catalyst, and the Claus reaction is conducted in the liquid phase in cocurrent flow of both gases and liquids. The reactor column 201 contains packing that is divided into sections 207, 208, 209, 210, 211, with each packed section providing intense mixing of the gas and liquid phases. Cooling is performed between each adjacent pair of sections by injection of water 212 that evaporates in the column. Other means of cooling, such as various methods of indirect heat exchange, can be substituted for the water. At the bottom of the column, the product mixture 213 which contains both gas and liquid flows into a gas-liquid-liquid separator 214 where the gas and the two liquid phases (solvent 206 and liquid sulfur 215) are separated, as in the process configurations of the preceding figures. The solvent 206 is recycled to the reactor inlet.

Figure 6:
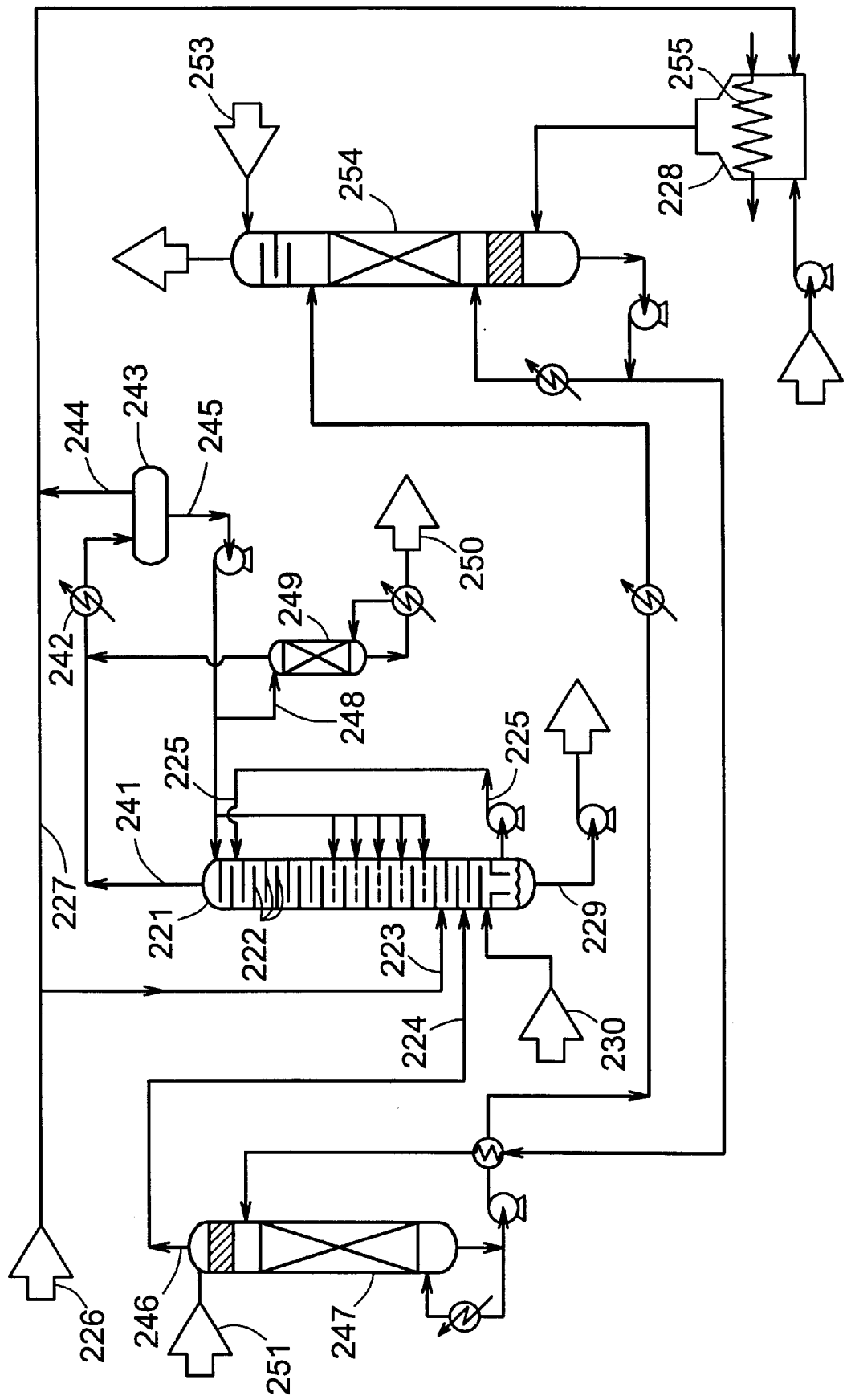
FIG. 6 is a process-flow diagram illustrating a still further embodiment of the invention similar to that of FIG. 5, except that in the reactor the flow of gas and liquids is countercurrent.

The components of the FIG. 5 process configuration that are not described in the preceding paragraph appear in the process configuration of FIG. 6 as well. The description of these components that appears in the following discussion of FIG. 6 applies to both FIGS. 5 and 6.

The cocurrent flow column 201 of FIG. 5 is replaced by a countercurrent flow column 221 in the process configuration of FIG. 6. This countercurrent flow column 221 contains bubble-cap trays 222, which allows the residence time of the gas and the liquids to be independently controlled. The individual trays also permit the depths of the, liquid sulfur and the solvent to be set independently. Countercurrent flow is achieved by introducing the $H_2S$-rich gas 223 and the gaseous $SO_2$ 224 at the bottom of the column 221 for upward flow while the organic solvent 225 with dissolved catalyst is introduced at the top for downward gravity flow. Of the feed of $H_2S$-rich gas 226 entering the system, a portion 227 amounting to up to 30% of the incoming total 226 is drawn off to bypass the reactor column 221 and to flow directly to the furnace 228.

The flows of the $H_2S$-rich gas 223 and the $SO_2$-containing gas 224 are controlled so that about 80% to 90% of the $H_2S$ and all, or virtually all, of the $SO_2$ react in the column. To maintain an economically effective reaction rate in the column, a high concentration of $H_2S$ in the gas phase should be maintained as the reaction proceeds. If the $H_2S$-rich gas feed contains a large quantity of other gases, the relative feed rates of $H_2S$ and $SO_2$ in the gas feeds to the column are preferably selected to result in a relatively large excess of $H_2S$ entering the column. Conversely, if the $H_2S$-rich gas feed is nearly pure $H_2S$, a relatively small $H_2S$ excess will suffice to maintain the reaction rate.

In the FIG. 6 configuration, the $SO_2$ stream 224 is introduced to the column 221 at a point below the inlet for the $H_2S$-rich gas 223. Even if only part of the $SO_2$ stream is introduced at this point, this causes the liquid sulfur 229 produced in the column to contact an $SO_2$-rich solution before leaving the column. This removes any undissolved $H_2S$ from the liquid sulfur, a favorable result since $H_2S$ has significant solubility in liquid sulfur and is toxic and hence an undesirable impurity. In addition, a small flow of stripping steam 230 may be introduced below the $SO_2$ inlet to strip $SO_2$ from both the sulfur 229 and the solvent 225.

The reaction occurring in the column 221 is a liquid-phase reaction between $H_2S$ and $SO_2$, both being absorbed from the gas phase by the circulating solvent 225 and introduced at relative rates to place $H_2S$ at a stoichiometric excess. At the temperature of the reaction, $H_2S$ and $SO_2$ have similar solubilities in glycols and glycol ethers. The use of excess $H_2S$ facilitates the substantially complete reaction of $SO_2$ by maintaining a relatively high concentration of $H_2S$ concentration in the solvent.

The vapor stream 241 leaving the column 221 consists primarily of water and unreacted $H_2S$ together with other components that were present in the original $H_2S$ feed 226. The vapor 241 is cooled 242, and the condensed water 245 is separated from the noncondensibles 244 in a gas-liquid separator 243. The noncondensibles 244 are sent to the furnace 228, and part of the condensate 245 is returned to the reactor column 221 as a coolant. An additional source of coolant, although not shown in the drawing, is water condensed from the $SO_2$-rich stream 246 leaving the $SO_2$ stripper 247 .

The remainder 248 of the condensate 245 from the reactor vapor stream is saturated with $H_2S$. This portion of the condensate is sent to a sour water stripper 249 to remove the $H_2S$. Part of the bottoms product 250 of the sour water stripper may be used for wash water 251 at the top of the $SO_2$ stripper and at the top 253 of the $SO_2$ absorver 254.

The noncondensibles 244 leaving the gas liquid separator 243 are combined with the portion 227 of the $H_2S$-rich gas feed that has bypassed the reactor column, and the combined stream flows to-the furnace 228 where it is burned with air. The quantity of air used in the furnace is preferably slightly more than the stoichiometric proportion required for complete combustion of the $H_2S$, hydrocarbons and other combustibles. The amount of excess air is kept low enough however to avoid $SO_3$ formation. The furnace 228 typically generates an exhaust gas containing $SO_2$ in an amount of 10% by volume or more. This gas will be cooled in the waste heat boiler 255 and then fed to the $SO_2$ absorber 254.

Excess $CO_2$ is less of a concern in the furnace than it is in a conventional Claus furnace in terms of maintaining a stable level of combustion in the furnace. In the conventional Claus process, only one-third of the $H_2S$ is burned in the furnace, and the furnace gas is thus diluted with a large quantity of excess $H_2S$ which is not present in the process described herein. If the an excessive amount of $CO_2$ or other inert gas is present in the furnace feed, a gaseous fuel such as natural gas can be added to insure stable combustion. The present invention also avoids the problems that soot creates in the conventional Claus reactors. In the conventional process, the soot, which results from the partial combustion of organic compounds in a fuel-rich mixture in the furnace, enters the gas-phase Claus reactor and fouls the solid-phase catalyst (as well as the sulfur product). This is avoided in this invention by conducting the Claus reaction in the liquid phase upstream of the furnace.

The process depicted in FIG. 6 offers the further advantage of permitting the use of one solvent in the absorber 254 and stripper 247 and another solvent in the reactor column 221. The two solvents can thus be chosen independently, each selected as the one best suited for the particular function that it serves in the individual units.

All units and unit operations, including strippers, absorbers, packed columns, separators, heat exchangers, and associated pumps and valves are of conventional construction from conventional materials whose choice will be readily apparent to the skilled chemical process engineer, particularly one with skill in the treatment of sour gas streams.

The foregoing is offered primarily for purposes of illustration. It will be readily apparent to those skilled in the art that the process flow schemes, relative flow rates, stream compositions, operating conditions, and other parameters of the process described herein may be further modified or substituted in various ways without departing from the spirit and scope of the invention.

What is claimed is:

1. A process for treating an $H_2S$-containing stream to convert said $H_2S$ to elemental sulfur, said process comprising:
   (a) feeding said $H_2S$-containing stream to a continuous-flow reactor and contacting said $H_2S$-containing stream in said reactor with an $SO_2$-containing stream and an organic liquid solvent under the following conditions:
      (i) said organic liquid solvent contains a homogeneous catalyst that promotes the liquid phase reaction $$2H_2S+SO_2 \rightarrow 3S+2H_2O \qquad (I)$$

(ii) the temperature in said reactor is maintained above the melting point of sulfur and below the boiling point of said solvent, and
   (iii) said $H_2S$-containing and $SO_2$-containing streams are fed at relative feed rates such that $H_2S$ is fed in excess relative to $SO_2$ in accordance with reaction (I) to convert substantially all of said $SO_2$ to liquid elemental sulfur and to produce reactor discharges containing said liquid elemental sulfur and gaseous unreacted $H_2S$;
   wherein both said $H_2S$-containing stream and said $SO_2$-containing streams are gas streams, and both $H_2S$ and $SO_2$ are absorbed in said reactor by said solvent, said solvent containing said catalyst dissolved therein;
   (b) combusting said unreacted $H_2S$ in said gaseous reactor effluent with an $O_2$-containing gas in accordance with the reaction $$2H_2S+3O_2 \rightarrow 2SO_2+2H_2O \qquad (III)$$

to convert said $H_2S$ to $SO_2$, and to produce a combustion gas containing $SO_2$ and $H_2O$; and
   (c) passing said combustion gas through an $SO_2$ absorber to recover substantially all $SO_2$ from said combustion gas, thereby leaving a tail gas substantially free of $H_2S$ and $SO_2$, and recycling $SO_2$ thus recovered to said continuous-flow reactor.

2. A process in accordance with claim 1 in which said temperature in (a)(ii) is maintained between 119° C. and 155° C.

3. A process in accordance with claim 1 in which said temperature in (a)(ii) is maintained between 125° C. and 145° C.

4. A process in accordance with claim 1 in which said reactor is a column-type gas-liquid contactor, and in which said gas streams flow cocurrently with said solvent and with said liquid elemental sulfur.

5. A process in accordance with claim 1 in which said reactor is a column-type gas-liquid contactor, and in which said gas streams flow countercurrently with said solvent and with said liquid elemental sulfur.

6. A process in accordance with claim 5 further comprising introducing said $SO_2$-containing stream into said column-type gas-liquid contactor at a location below the location of introduction of said $H_2S$-containing stream, both for upward flow countercurrent to downward flowing liquids therein, to remove dissolved $H_2S$ from liquid elemental sulfur prior to withdrawing said liquid elemental sulfur from said contactor.

7. A process in accordance with claim 1 further comprising:
   (d) passing said reactor discharge through a separator to separate a liquid sulfur phase, an organic liquid phase, and a gas phase into separate streams; and
   (e) recycling said liquid organic phase to the inlet of said continuous-flow reactor.

8. A process in accordance with claim 1 further comprising feeding an additional $H_2S$-containing gas stream to combusting step (b) that has not passed through said continuous-flow reactor of step (a) in combination with said unreacted $H_2S$ from said reactor discharge, the $H_2S$ in said additional $H_2S$-containing gas stream comprising up to about 30% of the total $H_2S$ fed to said process, the total $H_2S$ fed to said process being approximately 50% excess relative to said $SO_2$ fed to said continuous-flow reactor in accordance with reaction (I).

9. A process in accordance with claim 1 further comprising contacting said liquid elemental sulfur formed in step (a) with liquid-phase $SO_2$ to remove dissolved $H_2S$ from said liquid elemental sulfur.

10. A process in accordance with claim 1 in which said solvent selected from the group consisting of ethers of ethylene glycol, diethylene glycol, triethylene glycol, tetraethylene glycol, propylene glycol, dipropylene glycol, tripropylene glycol, and tetrapropylene glycol.

11. A process in accordance with claim 1 in which said solvent is a member selected from the group consisting of monomethyl, dimethyl, monoethyl, and diethyl ethers of ethylene glycol, diethylene glycol, triethylene glycol, tetraethylene glycol, propylene glycol, dipropylene glycol, tripropylene glycol, and tetrapropylene glycol.

12. A process in accordance with claim 1 in which said solvent is a member selected from the group consisting of monomethyl and dimethyl ethers of diethylene glycol, triethylene glycol, propylene glycol, dipropyleneglycol, and tripropylene glycol.

13. A process in accordance with claim 1 in which said homogeneous catalyst is a member selected from the group consisting of pyridine and isoquinoline, optionally substituted at one or more sites other than carbon atoms adjacent to the ring nitrogen with a polar group that is a member selected from the group consisting of hydroxyl, hydroxyalkyl, acetamido, acetamidoalkyl, acetyl, acetylalkyl, acetyloxy, acetyloxyalkyl, alkoxy, alkoxyalkyl, amino, alkylamino, and aminoalkyl.

14. A process in accordance with claim 1 in which said homogeneous catalyst is a member selected from the group consisting of pyridine and isoquinoline, substituted at a site other than a carbon atom adjacent to the ring nitrogen with a member selected from the group consisting of hydroxyl, hydroxymethyl, acetamido, acetamidomethyl, acetyl, acetylmethyl, acetyloxy, and acetyloxymethyl.

15. A process in accordance with claim 1 in which said homogeneous catalyst is pyridine substituted at a site other than a carbon atom adjacent to the ring nitrogen with a member selected from the group consisting of hydroxymethyl, acetamido, acetamidomethyl, acetyl, acetylmethyl, acetyloxy, and acetyloxymethyl.

16. A process in accordance with claim 1 in which said homogeneous catalyst is 3-(hydroxymethyl)pyridine.

17. A process in accordance with claim 1 in which substantially all the $SO_2$ recovered in step (c) is recycled to the continuous-flow reactor, and provides substantially the entire $SO_2$ feed thereto.

* * * * *

UNITED STATES PATENT AND TRADEMARK OFFICE
CERTIFICATE OF CORRECTION

PATENT NO. : 6,495,117 B1
DATED : December 17, 2002
INVENTOR(S) : Lynn

Figure 4:
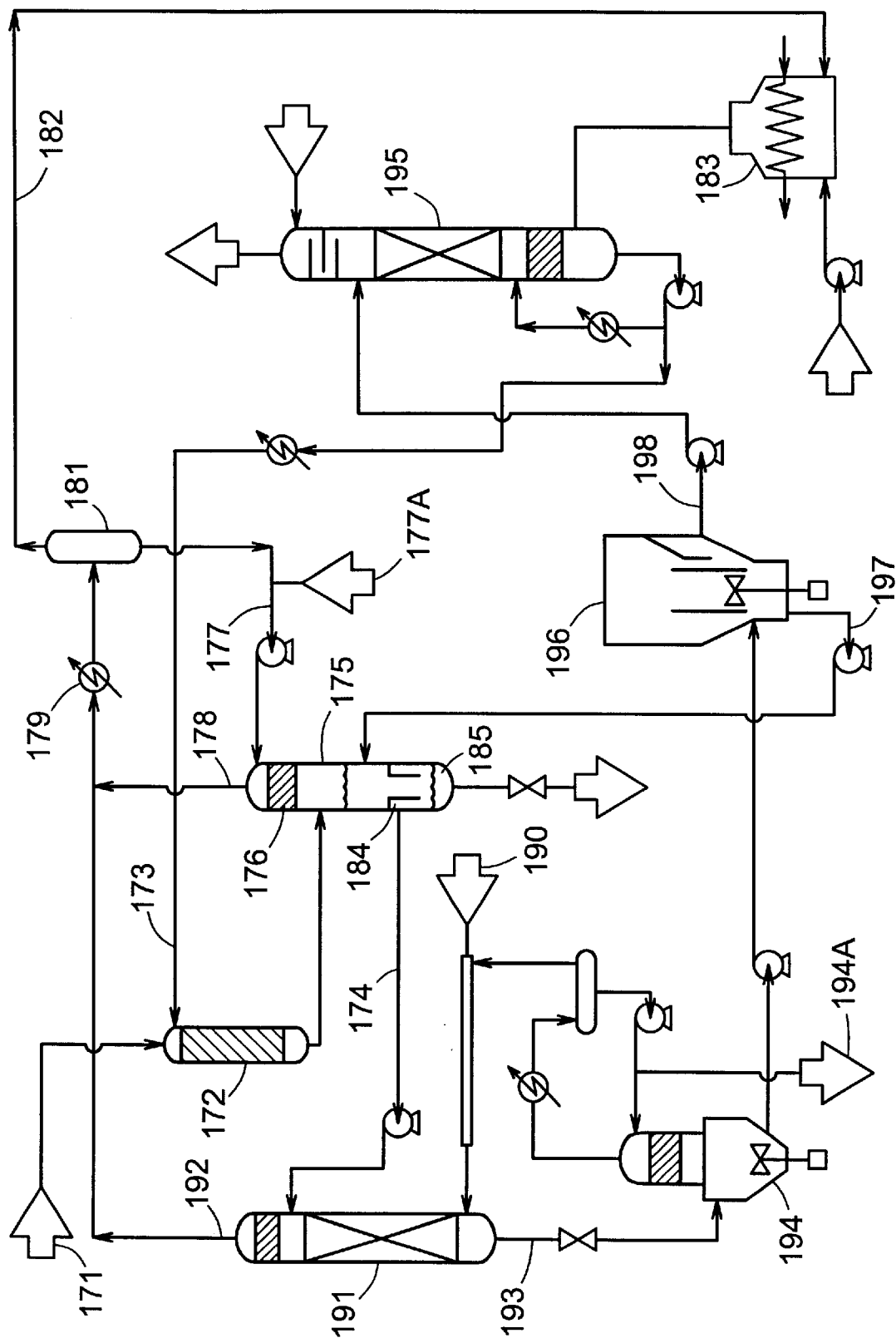
FIG. 4 is a process-flow diagram illustrating a further embodiment of the invention which reduces the amount of water recycled to the phase separator downstream of the reactor.

It is certified that error appears in the above-identified patent and that said Letters Patent is hereby corrected as shown below:

Column 10,
Line 63, add the following text:

-- A further variation is shown in Fig. 4. All units and unit operations, including strippers, absorbers, packed columns, separators, heat exchanges, and associated pumps and valves are of conventional construction from conventional materials whose choice will be readily apparent to the skilled chemical process engineer, particularly one with skill in the treatment of sour gas streams. --

Signed and Sealed this

Fourth Day of May, 2004

JON W. DUDAS
*Acting Director of the United States Patent and Trademark Office*